United States Patent Office
2,939,833
Patented June 7, 1960

2,939,833
REMOVAL OF ARSENIC FROM REFORMING FEED
Charles Wankat, Brookfield, and George R. Donaldson, Riverside, Ill., assignors, by mesne assignments, to Universal Oil Products Company, Chicago, Ill., a corporation of Delaware
No Drawing. Filed June 14, 1952, Ser. No. 293,655
4 Claims. (Cl. 208—91)

This invention relates to a catalytic conversion process and more particularly to a conversion process effected in the presence of a catalyst comprising alumina and a noble metal.

Recent developments in the field of reforming of gasoline in order to improve the antiknock characteristics of the gasoline and to the production of aromatic hydrocarbons are directed to the use of a catalyst comprising alumina and platinum. For the hydrocarbon conversion reactions it appears that alumina offers particular advantages in combination with a noble metal and particularly platinum. The association of alumina and platinum catalyzes the reactions desired in reforming operations to a greater extent than heretofore obtainable, with a minimum of undesired side reactions. The reactions desired in reforming operations include dehydrogenation of naphthenes to aromatics, dehydrocyclization of paraffins to aromatics, isomerization of alkyl-naphthenes containing 5 carbon rings to naphthenes containing 6 carbon rings and dehydrogenation to aromatics, isomerization of straight chain or slightly branched chain paraffins to more highly branched chain paraffins, controlled cracking or splitting of carbon to carbon bonds, desulfurization, etc. In the dehydrogenation operations to produce aromatics, the desired reactions include the dehydrogenation, dehydrocyclization and naphthene isomerization reactions set forth above.

As hereinbefore set forth, the combination of alumina and a noble metal and particularly platinum is especially active for effecting the desired reactions with a minimum of undesired side reactions. This catalyst appears peculiarly effective in the treatment of charge stocks comprising hydrocarbons and thus offers particular advantages for use in the conversion of hydrocarbons.

In the conversion of hydrocarbons, it now has been found that certain hydrocarbon charging stocks contain certain impurities which rapidly reactivate the alumina-platinum catalyst and render the same inactive for catalyzing the desired reactions as hereinbefore set forth. These impurities are present in hydrocarbon charge stocks in very minute quantities and, therefore, would not be expected to exert any substantial deactivating effect on the catalyst. Surprisingly, certain of these impurities, even in the very minute concentrations as are present in the hydrocarbon charge stocks, do rapidly deactivate the alumina-platinum catalyst and, therefore, render the process inoperable for the intended purpose. In accordance with the present invention, the charge stock is treated in order to remove the harmful impurities or to reduce the content thereof to a concentration at which the deleterious effects are substantially minimized.

In one embodiment the present invention relates to a conversion process effected in the presence of a catalyst comprising alumina and a noble metal, which comprises treating an impurity-containing charge with an aluminum silicate, separating therefrom a charge fraction having an impurity content of less than about 0.05 part per million and less than that of said charge, and subjecting said charge fraction to conversion in the presence of a catalyst comprising alumina and a noble metal.

In another embodiment the present invention relates to a hydrocarbon conversion process which comprises treating an arsenic-containing hydrocarbon charge with clay, separating therefrom a charge fraction having an arsenic content of less than about 0.05 part per million and less than that of said charge, and subjecting said hydrocarbon fraction to conversion in the presence of a catalyst comprising alumina and platinum.

In a specific embodiment the present invention relates to a process for producing reformed gasoline from an arsenic-containing hydrocarbon charge, which comprises treating the charge with clay, separating therefrom a gasoline fraction having an arsenic content of less than about 0.015 part per million and less than that of said charge, and reforming said gasoline fraction in the presence of a catalyst comprising alumina, platinum and combined halogen.

As will be noted from the embodiments, an arsenic-containing hydrocarbon charge is treated to lower the arsenic content to less than about 0.05 part per million. Preferably the arsenic content is reduced to below about 0.015 part per million. As hereinbefore set forth and as will be shown in the following examples, the presence of arsenic in concentrations of greater than even the minute quantities of 0.05 part per million rapidly deactivates the alumina-platinum catalyst. While it is believed that arsenic is the most harmful impurity, other undesirable impurities having a deleterious effect on the catalyst include molybdenum, antimony, nickel, cadmium and lead. It is understood that these impurities may be present as the element or probably as one or more compounds thereof, and that reference to the element in the present specifications and claims is intended to include the free element and/or compounds thereof. This method of referring to the element is justified because it appears that the element is the harmful component and that, when present as a specific compound, the compound may decompose and other compounds of the element formed during the conversion reaction. For example, it is believed that arsenic deactivates the catalyst by forming a platinum arsenide or other compound of platinum and arsenic. Although arsenic is considered as a non-metal by some authorities, it resembles the metals in a number of respects and, in view of the fact that the other impurities hereinbefore set forth are metals, it is understood that reference to metal impurities or similar phraseology is intended to include arsenic along with the other impurities as set forth above, and that removal of these metallic impurities below 0.05 part per million means that the treated charge does not contain any one of these impurities in a concentration above 0.05 part per million although the sum total of the impurities may be above 0.05 part per million.

As hereinbefore set forth, the novel features of the present invention are directed to catalysts comprising alumina and a noble metal. Platinum is the preferred noble metal for use in accordance with the present invention. Other noble metals include palladium, silver, gold, ruthenium, rhodium, osmium, iridium, etc., with the understanding that these catalysts are not necessarily equivalent. The platinum preferably is utilized in the catalyst in a concentration of from about 0.01% to about 1% by weight of the final catalyst, although it is understood that lower or higher concentrations of platinum, which generally will not be above about 10%, may be employed.

As hereinbefore set forth, the catalyst contains alumina. In one embodiment the alumina comprises a major proportion of the catalyst and may comprise, for example, over 95% by weight of the catalyst. In another embodiment, the catalyst may include alumina as well as other inorganic oxides as, for example, oxides of silicon, magnesium, zirconium, thorium, vanadium, titanium, boron, etc., or mixtures thereof, and the alumina moreover may comprise a minor proportion of the catalyst. For example, one catalyst may comprise silica-alumina-platinum and in one embodiment the silica may comprise from about 70% to about 95% and the alumina may comprise from about 5% to about 30% by weight of the mixture.

It is understood that the alumina and other inorganic oxides are porous, and reference to alumina in the present specifications and claims is intended to refer to porous alumina, including gamma-alumina, and not to include non-porous aluminas as a component of the catalyst in a substantial amount.

In a preferred embodiment the alumina-platinum catalyst also contains a halogen. The halogen may be in a concentration of from about 0.01% to about 8% by weight of the final catalyst, although higher or lower concentrations may be employed. The halogen is believed to be present in combined form, and the halogen preferably comprises combined fluorine which advantageously is present in a concentration of from about 0.01% to about 3% by weight of the catalyst. The combined chlorine generally is present in a concentration of from about 0.1% to about 8% by weight of the catalyst. The combined bromine and combined iodine generally are not as preferable, but may be employed, when desired, in a concentration of from about 0.01% to about 8% by weight of the catalyst. It is understood that the various halogens which may be employed are not necessarily equivalent and also that the combined halogen content of the catalyst may comprise a mixture of 2 or more of the halogens, in which case the total halogen concentration preferably comprises from about 0.01% to about 8% by weight of the catalyst.

As hereinbefore set forth, charge stocks containing arsenic are treated with an aluminum silicate to separate a charge fraction having an arsenic content of below about 0.05 part per million and preferably below about 0.015 part per million. The aluminum silicate preferably comprises a naturally occurring aluminum silicate and more particularly naturally occurring clays, which may be treated by acid or otherwise when desired. A particularly suitable treated clay is the commercially available Attapulgus clay. Other clays include fuller's earth, Silverton clay, etc. It is understood that synthetically prepared silica-alumina composites which may or may not contain other oxides, including those of magnesia, zirconia, vanadia, etc., or mixtures thereof, may be employed. Preferably the silica will comprise a major proportion of the composite and thus may range from 50% to 95% or more by weight and the alumina may range from about 5% to 50% by weight. Preferably the silica will comprise from about 80% to about 95% and the alumina from about 5% to about 20% of the composite. However, it is understood that the various aluminum silicates which may be used in accordance with the present invention are not necessarily equivalent.

Treatment with the aluminum silicate may be effected at any suitable temperature. This temperature may range from atmospheric to below that at which substantial cracking occurs. While the upper temperature limitation will vary with different charge stocks, it generally will not be above about 800° F., although in some cases higher temperature may be employed but the temperature should be that at which substantial cracking of the charge stocks does not occur. The pressure may range from atmospheric to 1000 pounds or more. The weight hourly space velocity, defined as the weight of oil per hour per weight of clay in the reaction zone, will be selected to obtain the desired reduction in arsenic content of the charge.

In another embodiment, particularly when the treatment is effected at temperatures above 500° F., the temperature may be progressively increased after a given period of operation. It has been found, and will be shown in the following examples, that substantially complete arsenic removal was obtained at a temperature of 700° F. but that after a period of operation the arsenic content of the product gradually increased. Upon increasing the temperature to 750° F., the arsenic content of the product was again lowered to that obtained at the 700° F. temperature.

In still another embodiment two or more different zones containing aluminum silicates may be employed, each of the zones being operated at the same or different conditions. For example, in one method, treatment with clay may be effected at temperatures below 400° F. and preferably atmospheric temperature in one or more zones, followed by treatment with clay at temperatures above 400° F. and preferably 500° to 800° F. in one or more zones, or the reverse procedure may be employed. When desired, different aluminum silicates may be employed in one or more of the multiple zones.

In another embodiment, it may be advisable to subject the clay treated distillate to fractionation or other methods in order to segregate a treated fraction further reduced in arsenic. With certain hydrocarbon distillates, the clay treatment may convert the arsenic into a different form, and the new arsenic compounds, when more volatile, may be removed as an overhead fraction by distillation or, when high boiling, may be retained in the bottoms of the distillation. In other cases, the treatment may be followed by water washing in order to further remove the small amount of arsenic compounds which may have been formed by the prior treatment and/or not removed thereby.

Treatment in accordance with the present invention may be effected in any suitable manner. In a preferred method, a bed of the aluminum silicate is disposed as a fixed bed in a reaction zone and the charge stock is passed therethrough in either upward or downward flow, this latter generally being preferred. When the treatment is to be effected at elevated temperature, the charge stock may be heated to the desired temperature and/or the treating zones may be heated in any suitable manner to obtain and/or maintain the desired temperature. Other methods of treatment may include the slurry type system in which the aluminum silicate is carried into a reaction zone as a slurry in the charge stock, the moving bed type process in which the aluminum silicate passes either concurrently or countercurrently to the charge stock, the fluidized type operation in which the charge and clay are maintained in a state of turbulence in the reaction zone, etc.

As hereinbefore set forth, the novel features of the present invention are particularly applicable to the treatment of a gasoline fraction to be subjected to reforming. It is understood that the gasoline fraction may comprise a full boiling range gasoline having an end boiling point of from about 400° to about 430° F., or any selected fraction thereof and that it may include components boiling above the gasoline range, thus having an end boiling point up to 500° F. or more. The hydrocarbon fraction preferably comprises a substantially saturated hydrocarbon distillate, including straight run gasoline, natural gasoline, etc., or mixtures thereof. In some cases it may comprise an unsaturated distillate, including cracked gasoline, as well as mixtures of the unsaturated gasoline and saturated gasoline. The reforming operation is effected at a temperature of from about 600° to about 1000° F. or more, a pressure of from about atmospheric to 1000 pounds per square inch or more, and a weight hourly space velocity from about 0.1 to 10 or more. The weight hourly space velocity is defined as the weight of oil per hour per weight of catalyst in the reaction zone. In one embodiment, the reforming is effected in the presence of hydrogen and, in this embodiment, the hydrogen produced in the process preferably is recycled for further use therein. The concentration of hydrogen to hydrocarbon in the reaction zone generally will be in a molar ratio of from about 0.1:1 to about 10:1 or more. When the hydrogen gas to be recycled contains hydrogen sulfide or other impurities, it is within the scope of the invention to treat the recycle gas to remove the impurities before reusing the gas in the process.

In another preferred embodiment, the novel features of the present invention are particularly applicable to the conversion of naphthenes into aromatics as hereinbefore set forth. Generally the charge in this embodiment will comprise a selected hydrocarbon distillate which, in one embodiment, may have a boiling range of from about 140° to about 280° F. The conditions of operation used in this embodiment are substantially the same as those hereinbefore set forth except that the temperature to be employed preferably is within the range of from about 800° to 1000° F. or more.

While the process of the present invention is particularly applicable to the reforming or aromatization reactions hereinbefore set forth, it is understood that the novel features may be employed in any process in which a catalyst comprising alumina and a noble metal and particularly platinum is used. Representative processes include dehydrogenation of normally gaseous aliphatic hydrocarbons, such as ethane, propane and butane to the corresponding olefins, dehydrogenation of mono-olefins to di-olefins, destructive hydrogenation or hydrocracking reactions in which a hydrocarbon and particularly oil heavier than gasoline is subjected to conversion to produce lower boiling products and particularly gasoline, non-destructive hydrogenation reactions, including hydrogenation of unsaturated aliphatic compounds, such as mono-olefins, di-olefins, etc. to form the corresponding saturated hydrocarbons, hydrogenation of unsaturated cyclic hydrocarbons, hydrogenation of unsaturated alcohols, ketones, acids, etc., oxidation of olefins to form the corresponding oxides, such as the oxidation of ethylene to ethylene oxide, propylene to propylene oxide, etc., oxidation of alcohols, ketones, etc. The conditions of operation to be employed will depend upon the particular reaction to be effected. Thus, for non-destructive hydrogenation reactions, the temperature may range from atmospheric to 500° F. or more, the pressure from about 10 to about 2000 pounds or more, and the weight hourly space velocity of from about 0.1 to 10 or more.

The conversion reactions mentioned above may be effected in any suitable manner. The reforming process thus may be effected in the fixed bed, slurry type, moving bed or fluidized type process heretofore described in connection with the pretreatment of the charge stock in the presence of the aluminum silicate.

The following examples are introduced to illustrate further the novelty and utility of the present invention but not with the intention of unduly limiting the same.

*Example I*

To a catalyst comprising alumina, about 0.3% by weight of platinum and about 0.2% by weight of combined fluorine, arsenic was added in a concentration of 0.0025 gram atoms per 50 grams of catalyst. The arsenic was added as arsenic pentoxide in ammoniacal solution by dissolving the required amount in 50 ml. of water and pouring over 50 grams of the catalyst. The catalyst was allowed to stand for one-half hour, then was dried on a water bath and finally calcined for 3 hours in a muffle furnace at 932° F.

The catalysts in this example were utilized for the aromatization of a Mid-Continent naphtha having an A.P.I. gravity at 60° F. of 52.7, an aromatic content of 8.8% and a boiling range of 229° to 387° F. The aromatization was effected at a temperature of 977° F., a superatmospheric pressure of 300 pounds per square inch and a hydrogen to hydrocarbon molar ratio of 1.75:1.

Catalyst A comprised alumina-platinum-halogen composite as described above but not containing the arsenic. Catalyst B comprised the catalyst containing the arsenic as described above.

In the aromatization runs, Catalyst A produced an average of 48.3% by weight of aromatics. In contrast, Catalyst B under the same conditions produced only 23.6% by weight of aromatics. It thus will be noted that the arsenic reduced the aromatization activity of the catalyst to less than half of the catalyst not containing arsenic.

*Example II*

Other catalysts were prepared in a similar manner as described in Example I but contained 0.0025 gram atoms of molybdenum, antimony, nickel, cadmium, and lead. These catalysts when utilized under the same conditions as described in Example I produced the following yields of aromatics.

TABLE

| Added component: | Percent aromatics |
|---|---|
| None | 48.3 |
| Molybdenum | 24.5 |
| Antimony | 30.0 |
| Nickel | 30.2 |
| Cadmium | 30.7 |
| Lead | 33.5 |

Here again it will be noted that catalysts containing as low as 0.0025 gram atoms of the various impurities considerably reduced the aromatization activity of the catalysts.

*Example III*

In a commercial reforming process utilizing a catalyst as described in Example I and charging approximately 1200 barrels per day of a Mid-Continent naphtha, the activity of the catalyst decreased rapidly. The naphtha had an A.P.I. gravity of about 53.0, a boiling range of from 210° to 428° F. and contained approximately 6.8% by weight of aromatics. It was found that the naphtha being charged to this unit contained approximately 0.16 part per million of arsenic.

As hereinbefore set forth, one of the desired reactions in reforming operations is dehydrogenation of the naphthenes to aromatics. This dehydrogenation is highly endothermic and, therefore, results in a comparatively large temperature differential between the inlet and outlet of a reaction zone maintained under adiabatic conditions. This temperature differential is indicative of the dehydrogenation activity of the catalyst. In this process, the naphtha was introduced into the reaction zone at a temperature of approximately 900° F. and in normal operations a temperature drop of above about 50 degrees indicates that satisfactory dehydrogenation is obtained. However, because of the arsenic content of the naphtha, the temperature differential between the inlet and outlet of the reaction zone on the first day was 53° F. but after 11 days of operation it dropped to 17° F. It readily is apparent that this small temperature differential indicates substantial loss in the dehydrogenation activity of the catalyst.

As measured in octane number, the operation in which the temperature differential between the inlet and outlet of the reaction zone was above about 50° F. resulted in a reformate having an F-1+3 cc. of tetraethyl lead octane number of 92. In contrast, under the same conditions of operation but utilizing the catalyst deactivated by arsenic-containing impurities, in which the temperature differential between the inlet and outlet of the reaction zone was only 17° F., the F-1+3 cc. of tetraethyl lead octane number was only 72.4. The F-1+3 cc. of lead octane number of the charge fraction was 66.5. Thus it is seen that the temperature differential in the reaction zone is a measure of the activity of the catalyst.

*Example IV*

The naphtha treated in this example comprised a Mid-Continent naphtha having an A.P.I. gravity of 55.4°, a bromine number of 1.1 and a boiling range of from 188° to 414° F. This naphtha had an arsenic content of 0.16 part per million.

A sample of this naphtha was passed through Attapulgus clay at 75° F., atmospheric pressure and a liquid hourly space velocity of 1. This treatment reduced the arsenic content of the naphtha to less than 0.001 part per million.

*Example V*

Another sample of the naphtha described in Example IV was treated under substantially the same conditions except that the temperature of treatment was 250° F. This treatment served to reduce the arsenic content of the naphtha to less than 0.001 part per million.

*Example VI*

Another sample of the naphtha described in Example IV was treated under substantially the same conditions except that the temperature of treatment was 500° F. This treatment served to reduce the arsenic content of the naphtha to less than 0.001 part per million.

*Example VII*

Another sample of the naphtha described in Example IV was treated under substantially the same conditions except that the temperature of treatment was 700° F. This treatment served to reduce the arsenic content of the naphtha to less than 0.001 part per million.

*Example VIII*

The naphtha used in this example was a Pennsylvania straight run naphtha having an A.P.I. gravity of 56.9°, a boiling range of 201° to 367° F., and contained 0.02 parts per million of arsenic.

This naphtha was treated with Attapulgus clay at 750° F. and 50 pounds per square inch pressure. This treatment served to reduce the arsenic content of the naphtha to less than 0.001 part per million up to the point that an equivalent of 1000 barrels of naphtha per ton of clay had been treated. However, as the operation continued and the clay life reached the equivalent of 2000 barrels of naphtha per ton of clay, the arsenic content of the product was 0.003 part per million. The temperature of the clay treatment was increased to 750° F. and this served to decrease the arsenic content of the naphtha to below 0.001 part per million.

*Example IX*

The naphtha used in this example was a straight run naphtha having an A.P.I. gravity 65.3°, initial boiling point of 114° F. and an end boiling point of 365° F. This naphtha had an arsenic content of 0.80 part per million.

This naphtha was treated with Attapulgus clay at 700° F., 50 pounds' pressure and a weight hourly space velocity of 1. This treatment served to reduce the arsenic content to 0.016 part per million.

*Example X*

The naphtha described in Example IV may be treated with a synthetically prepared silica-alumina composite containing approximately 13% by weight of alumina. This composite is prepared by reacting sulfuric acid with water glass to form silica gel, washing to remove soluble impurities, then impregnating with aluminum sulfate solution, precipitating aluminum hydroxide by means of ammonium hydroxide and heating to form alumina.

When treating the naphtha containing 0.16 part per million of arsenic with the synthetic silica-alumina composite at atmospheric temperature, the arsenic content of the naphtha will be reduced to below about 0.015 part per million.

*Example XI*

A synthetically prepared silica-alumina composite manufactured in substantially the same manner as described in Example X may be utilized as a catalyst in the cracking of gas oil to gasoline. The catalyst after having lost a substantial portion of activity to catalyze the cracking reaction may be used for the treatment of a straight run naphtha having an arsenic content in excess of about 0.05 part per million. This treatment may be effected at a temperature of about 250° F. and will serve to lower the arsenic content of the naphtha to below about 0.015 part per million.

We claim as our invention:

1. A process for the conversion of a petroleum distillate boiling in the gasoline range and containing arsenic in an amount having a deactivating effect on noble metal catalysts, which comprises treating the distillate with an aluminum silicate at a temperature of from about atmospheric to below that at which substantial cracking occurs to remove arsenic therefrom, separating from the aluminum silicate a gasoline fraction having an arsenic content of less than about 0.05 part per million and less than that of said distillate, and reforming the separated gasoline fraction in the presence of a catalyst comprising a noble metal.

2. A process for the conversion of a petroleum distillate boiling in the gasoline range and containing arsenic in an amount having a deactivating effect on platinum catalysts, which comprises treating the distillate with clay at a temperature of from about atmospheric to below that at which substantial cracking occurs to remove arsenic therefrom, separating from the clay a gasoline fraction having an arsenic content of less than about 0.015 part per million and less than that of said distillate, and reforming the separated gasoline fraction in the presence of a catalyst comprising alumina and platinum.

3. A process for the conversion of a petroleum distillate boiling in the gasoline range and containing arsenic in an amount having a deactivating effect on platinum catalysts, which comprises treating the distillate with a synthetically prepared silica-alumina composite at a temperature of from about atmospheric to below that at which substantial cracking occurs to remove arsenic therefrom, separating from the silica-alumina composite a gasoline fraction having an arsenic content of less than about 0.015 part per million and less than that of said distillate, and reforming said separate gasoline fraction in the presence of a catalyst comprising alumina, platinum and combined halogen.

4. In the reforming of a petroleum naphtha containing arsenic in an amount which is deleterious to a platinum reforming catalyst, the steps which comprise treating said naphtha in the liquid phase at a temperature of from about atmospheric to about 375° F. with acid-treated adsorptive clay, whereby said arsenic is removed, and subjecting the treated stock to reforming conditions in the presence of a platinum reforming catalyst.

References Cited in the file of this patent

UNITED STATES PATENTS

| | | |
|---|---|---|
| 2,187,741 | Houdry | Jan. 23, 1940 |
| 2,368,261 | Neef | Jan. 30, 1945 |
| 2,479,110 | Haensel | Aug. 16, 1949 |
| 2,689,825 | McKinley | Sept. 21, 1954 |

OTHER REFERENCES

Lewis et al.: Ind. and Eng. Chem., Anal. Ed., vol. 9, pages 405–406 (1937).

Thomas: "The Science of Petroleum," vol. 11, Oxford Univ. Press, page 1054 (1938).

Berkman: "Catalysis," Reinhold Pub. Co., 1940, pages 393, 395 and 402.

"Chemical Refining of Petroleum," Kalichevsky et al., 2nd Edition, page 34, Reinhold Pub. Co., New York (1942).

Maxted: "Journal of the Society of Chemical Industry," vol. 67, pages 93–97, March 1948.

"Chem. Abstracts," vol. 45, 3698 g, May 10, 1951.